United States Patent
Prociw et al.

(10) Patent No.: US 10,309,651 B2
(45) Date of Patent: *Jun. 4, 2019

(54) INJECTORS FOR MULTIPOINT INJECTION

(71) Applicant: Delavan Inc, West Des Moines, IA (US)

(72) Inventors: Lev Alexander Prociw, Johnston, IA (US); Jason Ryon, Carlisle, IA (US)

(73) Assignee: DELAVAN INC, West Des Moines, IA (US)

( * ) Notice: Subject to any disclaimer, the term of this patent is extended or adjusted under 35 U.S.C. 154(b) by 671 days.

This patent is subject to a terminal disclaimer.

(21) Appl. No.: 14/835,654

(22) Filed: Aug. 25, 2015

(65) Prior Publication Data

US 2015/0361896 A1 Dec. 17, 2015

Related U.S. Application Data

(63) Continuation of application No. 13/665,497, filed on Oct. 31, 2012, now Pat. No. 9,188,063.

(Continued)

(51) Int. Cl.
  *F23R 3/14* (2006.01)
  *F23R 3/12* (2006.01)
  (Continued)

(52) U.S. Cl.
  CPC .............. *F23R 3/14* (2013.01); *F02C 7/22* (2013.01); *F23D 11/107* (2013.01); *F23R 3/10* (2013.01);
  (Continued)

(58) Field of Classification Search
  CPC ...... F23R 3/10; F23R 3/12; F23R 3/14; F23R 3/28; F23R 3/286; F23R 3/30
  See application file for complete search history.

(56) References Cited

U.S. PATENT DOCUMENTS 1,875,457 A 9/1932 Hemmingsen
2,607,193 A 8/1952 Berggren et al.
(Continued)

FOREIGN PATENT DOCUMENTS

BE 488386 4/1948
BE 488386 A 4/1949
(Continued)

OTHER PUBLICATIONS

European Search Report for corresponding Application No. 12191139.0, dated Dec. 22, 2016, 10 pages.
(Continued)

*Primary Examiner* — Craig Kim
(74) *Attorney, Agent, or Firm* — Locke Lord LLP; Scott D. Wofsy

(57) ABSTRACT

An injector for a multipoint combustor system includes an inner air swirler which defines an interior flow passage and a plurality of swirler inlet ports in an upstream portion thereof. The inlet ports are configured and adapted to impart swirl on flow in the interior flow passage. An outer air cap is mounted outboard of the inner swirler. A fuel passage is defined between the inner air swirler and the outer air cap, and includes a discharge outlet between downstream portions of the inner air swirler and the outer air cap for issuing fuel for combustion. The outer air cap defines an outer air circuit configured for substantially unswirled injection of compressor discharge air outboard of the interior flow passage.

10 Claims, 3 Drawing Sheets

Related U.S. Application Data

(60) Provisional application No. 61/555,363, filed on Nov. 3, 2011.

(51) Int. Cl.

| | | |
|---|---|---|
| *F23R 3/10* | (2006.01) | |
| *F23R 3/28* | (2006.01) | |
| *F23R 3/30* | (2006.01) | |
| *F23D 11/10* | (2006.01) | |
| *F02C 7/22* | (2006.01) | |

(52) U.S. Cl.
CPC .................. *F23R 3/12* (2013.01); *F23R 3/28* (2013.01); *F23R 3/286* (2013.01); *F23R 3/30* (2013.01); *F23D 2900/11101* (2013.01)

(56) References Cited

U.S. PATENT DOCUMENTS

| | | | |
|---|---|---|---|
| 3,680,793 | A | 8/1972 | Tate et al. |
| 3,720,058 | A | 3/1973 | Collinson et al. |
| 3,912,164 | A | 10/1975 | Lefebvre et al. |
| 3,937,011 | A | 2/1976 | Caruel et al. |
| 3,943,705 | A | 3/1976 | DeCorso et al. |
| 3,980,233 | A | 9/1976 | Simmons et al. |
| 4,598,553 | A | 7/1986 | Saito et al. |
| 4,653,278 | A | 3/1987 | Vinson et al. |
| 5,409,169 | A | 4/1995 | Saikalis et al. |
| 5,713,206 | A | 2/1998 | McWhirter et al. |
| 5,860,600 | A | 1/1999 | Schindler et al. |
| 6,003,781 | A | 12/1999 | Kwan |
| 6,092,363 | A | 7/2000 | Ryan |
| 6,247,317 | B1 | 6/2001 | Kostka |
| 6,360,525 | B1 | 3/2002 | Senior et al. |
| 6,363,726 | B1 | 4/2002 | Durbin et al. |
| 6,533,954 | B2 | 3/2003 | Mansour et al. |
| 6,688,534 | B2 | 2/2004 | Bretz |
| 6,755,024 | B1 | 6/2004 | Mao et al. |
| 6,775,984 | B2 | 8/2004 | Lavie et al. |
| 6,854,670 | B2 | 2/2005 | Sumisha et al. |
| 6,863,228 | B2 | 3/2005 | Mao et al. |
| 7,454,914 | B2 | 11/2008 | Prociw |
| 7,509,811 | B2 | 3/2009 | Chen et al. |
| 7,520,134 | B2 | 4/2009 | Durbin et al. |
| 7,533,531 | B2 | 5/2009 | Prociw et al. |
| 7,654,088 | B2 | 2/2010 | Shafique et al. |
| 7,891,193 | B2 | 2/2011 | Hernandez et al. |
| 7,926,178 | B2 | 4/2011 | Thomson et al. |
| 7,926,282 | B2 | 4/2011 | Chew et al. |
| 8,015,796 | B2 | 9/2011 | Babu et al. |
| 8,074,452 | B2 | 12/2011 | Prociw et al. |
| 8,171,735 | B2 | 5/2012 | Mancini et al. |
| 8,186,163 | B2 | 5/2012 | Hernandez et al. |
| 8,347,630 | B2 | 1/2013 | Lovett et al. |
| 8,733,105 | B2 | 5/2014 | Toon |
| 2002/0134084 | A1 | 9/2002 | Mansour et al. |
| 2004/0060301 | A1 | 4/2004 | Chen et al. |
| 2005/0039456 | A1 | 2/2005 | Hayashi |
| 2005/0133642 | A1 | 6/2005 | Rackwitz |
| 2005/0252217 | A1 | 11/2005 | Chen et al. |
| 2005/0279862 | A1 | 12/2005 | Mao |
| 2007/0010727 | A1 | 1/2007 | Van Beek et al. |
| 2007/0101727 | A1 | 5/2007 | Prociw |
| 2008/0236165 | A1 | 10/2008 | Baudoin et al. |
| 2009/0050710 | A1 | 2/2009 | Myers et al. |
| 2009/0111063 | A1 | 4/2009 | Boardman et al. |
| 2009/0224080 | A1 | 9/2009 | Chew et al. |
| 2009/0255258 | A1 | 10/2009 | Bretz et al. |
| 2010/0050644 | A1 | 3/2010 | Pidcock et al. |
| 2011/0031333 | A1 | 2/2011 | Short |
| 2012/0039761 | A1 | 2/2012 | Sprouse et al. |
| 2012/0186259 | A1 | 7/2012 | Hoke |
| 2012/0228397 | A1 | 9/2012 | Thomson |
| 2014/0090382 | A1 | 4/2014 | Sandelis et al. |
| 2014/0318137 | A1 | 10/2014 | McMasters et al. |
| 2014/0332602 | A1 | 11/2014 | Cramb et al. |
| 2016/0290291 | A1 | 10/2016 | Prociw |
| 2016/0290649 | A1 | 10/2016 | Prociw |

FOREIGN PATENT DOCUMENTS

| | | |
|---|---|---|
| EP | 0689007 A1 | 12/1995 |
| EP | 1526332 A2 | 4/2005 |
| EP | 1710500 A1 | 10/2006 |
| EP | 2497922 A2 | 9/2012 |
| EP | 2500641 A1 | 9/2012 |
| EP | 2589866 A2 | 5/2013 |
| EP | 2775202 A2 | 9/2014 |
| GB | 2131154 | 5/1984 |
| GB | 2131154 A | 6/1984 |
| GB | 2459041 | 10/2009 |
| GB | 2459041 A | 10/2009 |
| GB | 2459771 | 11/2009 |
| GB | 2459771 A | 11/2009 |
| JP | 2005061715 A | 3/2005 |
| WO | 89/05195 | 6/1986 |
| WO | WO-1989/05195 A1 | 6/1989 |
| WO | WO-2005/061964 A1 | 7/2005 |
| WO | WO-2014011405 A1 | 1/2014 |
| WO | WO-2014204449 A1 | 12/2014 |

OTHER PUBLICATIONS

Patent Translate, Powered by EPO and Google—Machine Translation of BE 488386, generated on Jan. 11, 2017.

Extended European Search Report dated Dec. 22, 2016, issued during the prosecution of European Patent Application No. 12191139.0 (9 pages).

Extended European Search Report dated Dec. 14, 2016, issued during the prosecution of European Patent Application No. 12190975.8 (8 pages).

R. Tacina et al. "Experimental Investigation of a Multiplex Fuel Injector Module With Discrete Jet Swirlers for Low Emission Combustors," NASA/TM-2004-212918; AIAA-2004-0185 (2004).

C. Lee et al., "High Pressure Low Nox Emissions Research: Recent Progress at NASA Glenn Research Center," ISABE-2007-1270 (2007).

K. M. Tacina et al. "NASA Glenn High Pressure Low NOX Emissions Research," NASA/TM-2008-214974(2008).

International Search Report for PCT Application No. PCT/US2013/048201, dated Sep. 25, 2013.

INJECTORS FOR MULTIPOINT INJECTION

CROSS-REFERENCE TO RELATED APPLICATIONS

This application is a continuation of U.S. patent application Ser. No. 13/665,497 filed Oct. 31, 2012, which claims the benefit of priority to U.S. Provisional Patent Application No. 61/555,363 filed Nov. 3, 2011, each of which is incorporated by reference herein in its entirety.

STATEMENT REGARDING FEDERALLY SPONSORED RESEARCH OR DEVELOPMENT

This invention was made with government support under contract number NNC11CA15C awarded by NASA. The government has certain rights in the invention.

BACKGROUND OF THE INVENTION

1. Field of the Invention

The present invention relates to multipoint injection, and more particularly, to fuel injectors for use in multipoint fuel injection such as in gas turbine engines.

2. Description of Related Art

NASA's "Environmentally Responsible Aircraft" (ERA) N+2 advanced, low NOx combustor technologies program is looking at combustion technologies suitable for the 2020 time frame. The objective of this program is to develop fuel-air mixing concepts and associated fuel control valves. The low emissions combustor concept must be capable of meeting or exceeding the N+2 LTO NOx goal of 75% reduction from the ICAO standard adopted by CAEP 6 at engine pressure ratios of at least 55.

In the early 2000's, the ability of a multipoint lean direct injection (LDI) concept was demonstrated to achieve very low NOx emissions index (EI) levels as tested at the NASA high pressure test facilities. The program was successful in demonstrating the ability of the multipoint concept to deal with NOx at high power conditions but was not optimized to perform equally as well at low power conditions such as start, ground idle, and flight idle conditions.

Conventional methods and systems have generally been considered satisfactory for their intended purpose. However, there is still an need in the art for multipoint fuel injection arrangements that allow for improved performance at high and low power operation while significantly reducing NOx emissions. There also remains a need in the art for such multipoint fuel injection arrangements that are easy to make and use.

SUMMARY OF THE INVENTION

An airblast injector for a multipoint combustor system is provided. The injector includes an inner air swirler which defines an interior flow passage and a plurality of swirler inlet ports in an upstream portion thereof. The swirler inlet ports are configured and adapted for fluid communication of compressor discharge air through the swirler inlet ports into the interior flow passage such that swirl is imparted on flow in the interior flow passage. The injector also includes an outer air cap mounted outboard of the inner air swirler with a fuel passage defined between the inner air swirler and the outer air cap. The fuel passage includes a discharge outlet between downstream portions of the inner air swirler and the outer air cap for issuing fuel for combustion. The outer air cap defines an outer air circuit configured for substantially swirl free injection of compressor discharge air outboard of the interior flow passage.

It is contemplated that in certain embodiments, the outer air cap includes a plurality of cylindrical bores therethrough radially outboard of the fuel passage with the cylindrical bores defining the outer air circuit. The cylindrical bores can all be aligned parallel with a longitudinal axis defined by the inner air swirler and outer air cap. The inner air swirler and outer air circuit can be configured and adapted to pass about 30-60% of the total airflow of the injector through the inner air swirler.

In certain embodiments, the outer air cap includes at least one slotted outer air flow channel radially outboard of the fuel passage which defines the outer air circuit and can converge downstream towards the longitudinal axis. The inner air swirler and outer air circuit can be configured and adapted to pass about 30-60% of the total airflow of the injector through the inner air swirler.

In accordance with one aspect of the invention, the inner air swirler can include an upstream dome with a plurality of cylindrical swirl bores defined therethrough for passage of compressor discharge air into the inner air swirler. The cylindrical bores of the dome can be radially offset and converge downstream relative to the longitudinal axis. It is also contemplated that the fuel passage can include a multi-start threaded passage defined between the inner air swirler and the outer air cap for swirling the fuel and providing even fuel distribution at low pressures.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
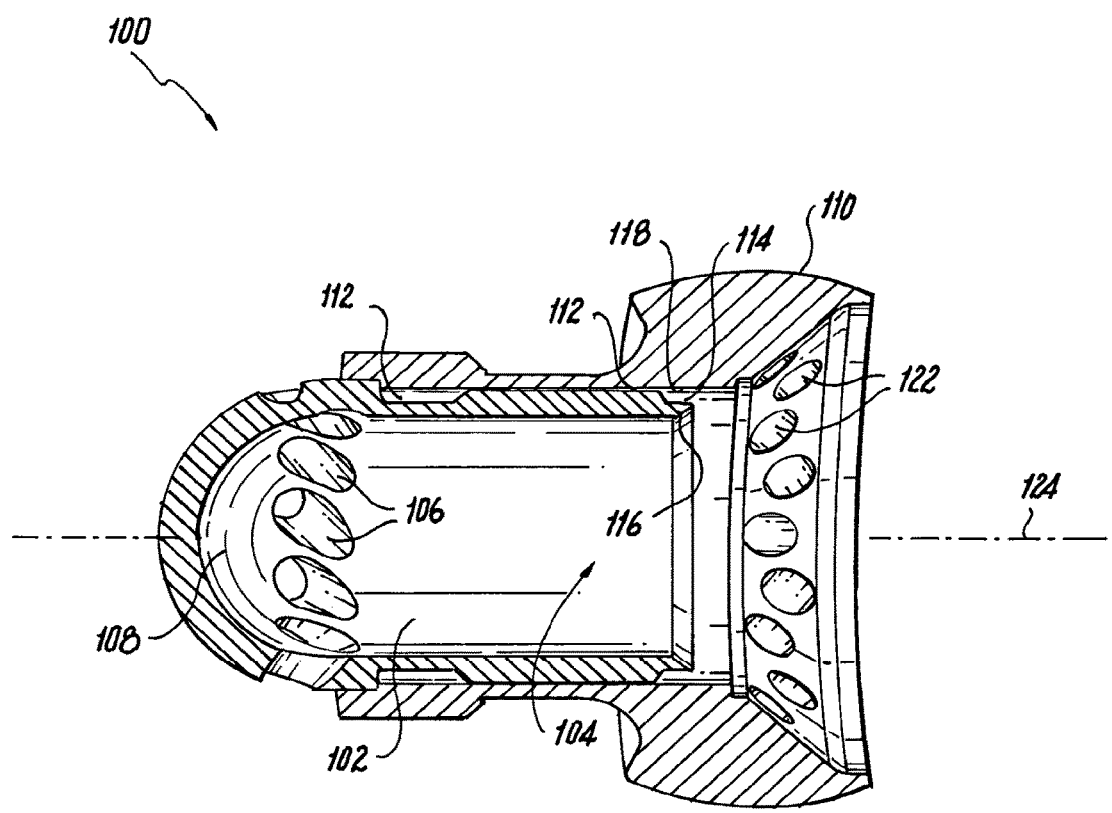
FIG. 1 is a cross-sectional side elevation view of an exemplary embodiment of an airblast injector constructed in accordance with the present invention.

Reference will now be made to the drawings wherein like reference numerals identify similar structural features or aspects of the subject invention. For purposes of explanation and illustration, and not limitation, a partial view of an exemplary embodiment of a fuel injector in accordance with the invention is shown in FIG. 1 and is designated generally by reference character 100. Other embodiments of fuel injectors in accordance with the invention, or aspects thereof, are provided in FIGS. 2-3, as will be described. The invention can be used, for example, to reduce $NO_X$ emissions index ($EINO_X$) in gas turbine engines.

The fuel injectors of the present invention are advantageous for use in multipoint fuel-injection systems. Multipoint refers to the use of a large number of small mixers to introduce fuel and air into a combustor from a wall at the dome. In lean direct injection, nearly all of the air that enters the combustor does so through the fuel/air mixers, and no additional air holes as might be used in conventional combustors are required. The basic impetus behind multipoint injection of fuel through a large number of injection sites is to promote rapid mixing and to reduce emissions such as $NO_X$. One factor thought to be a controlling parameter for the quantity of NOx produced in a typical combustor is the volume of recirculation downstream of the mixer. If the recirculation volume is proportional to the cube of the diameter of the mixer, and if the $NO_X$ produced is proportional to the recirculation volume, and the fuel flow is taken to be proportional to the square of the diameter of the mixer, then a larger nozzle will produce greater fuel flow, but also a greater emission index of $NO_X$ ($EINO_X$). For example, a nozzle with a diameter of 3 units will produce approximately 3 times the $EINO_X$ of 9 nozzles, each with a diameter of 1 unit, at the same temperature and pressure and same total fuel and air flow.

Figure 2:
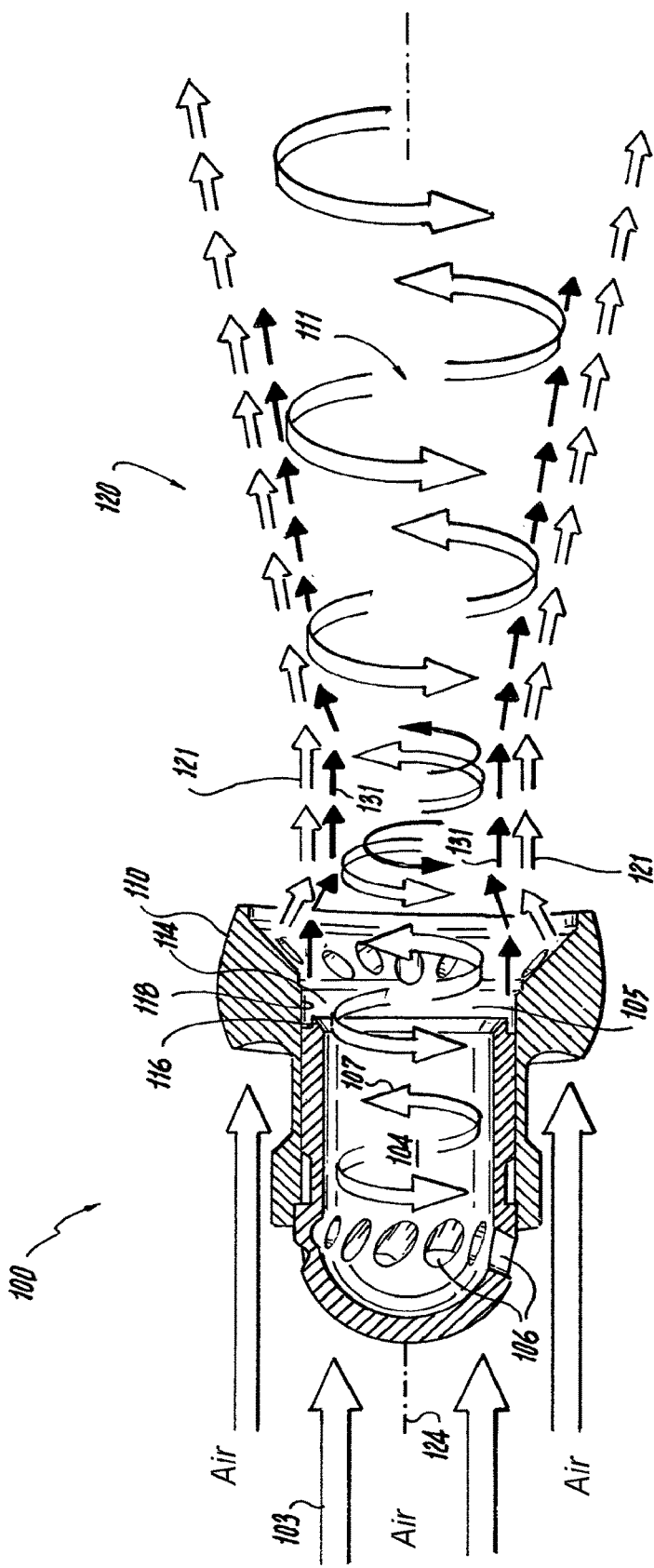
FIG. 2 is a cross-sectional view of the airblast injector of FIG. 1, schematically illustrating fluid flow passing through the injector.

With reference now to FIGS. 1-2, an exemplary fuel injector 100 for use in a multipoint fuel injector system includes an inner air swirler 102 which defines an interior flow passage 104 and a plurality of swirler inlet ports 106 in an upstream portion 108 thereof. Swirler inlet ports 106 are configured and adapted for fluid communication of compressor discharge air 103 (FIG. 2) through swirler inlet ports 106 into interior flow passage 104 such that swirl is imparted onto flow in interior flow passage 104 as indicated in FIG. 2 by arrows 107. Injector 100 also includes an outer air cap 110 mounted outboard of inner swirler 102 with a fuel passage 112 defined between inner air swirler 102 and outer air cap 110. Fuel passage 112 includes a discharge outlet 114 between downstream portions 116, 118 of inner air swirler 102 and outer air cap 110, respectively, for issuing fuel for combustion. Outer air cap 110 defines an outer air circuit 120 (shown schematically in FIG. 2) configured for substantially swirl free injection of compressor discharge air outboard of interior flow passage 104, as indicated by the straight white arrows 121 in FIG. 2.

Outer air cap 110 includes a plurality of cylindrical bores 122 therethrough radially outboard of fuel passage 112. Cylindrical bores 122 define outer air circuit 120, and can converge at an angle of about 35 degrees or less, preferably between 15-20 degrees, and most preferably closer to 15 degrees, relative to a longitudinal axis 124 defined by inner air swirler 102 and outer air cap 110. Cylindrical bores 122 may alternatively be aligned parallel with longitudinal axis 124, and configured to inject air of outer air circuit 120 parallel thereto. Cylindrical bores 122 may be formed as discrete holes which orient the outer air stream or air circuit 120 such that air of outer air circuit 120 exits downstream portions 116, 118 of injector 100 at an angle, converging toward longitudinal axis 124 as shown, or substantially parallel thereto. Inner air swirler 102 and outer air circuit 120 can be configured and adapted to pass about 30-60% of the total airflow of injector 100 through inner air swirler 102, with a preferred range of 40-45%, preferably closer to 40%. Outer air circuit 120 functions to form an outer sheath or barrier between adjacent nozzles in multipoint injection systems. Additionally, the substantially swirl free air of the outer sheath functions to enhance mixing of the fuel and air as further described below.

As shown in FIG. 2, outer air cap 110 is spherically shaped at a distal end thereof, at or about its maximum diameter. This spherical shape allows nozzle 100 to be rotated to avoid spraying fluid on adjacent walls while still permitting sealing thereof within a cylindrical sealing feature to permit axial travel during thermal growth and contraction of the combustor.

Despite the totally non swirling air of the outer air sheath, a central recirculation zone will still form in nozzle 100, as well as outer corner recirculation in the combustor. The outer layer of unswirled air behaves like an ejector which forms an external toroidal vortex rather than the strong divergence of flow to the walls as would occur with conventional swirling flow. When a number of these nozzles 100 are arranged in an array, this characteristic allows individual nozzles 100 to mix metered fuel and air in a segregated fashion from surrounding nozzles before adjacent flows mixed. By contrast, in conventional arrangements with high swirl in the outer air sheaths, adjacent air streams mix with one another more intensely than they mix with the fuel, thereby squandering the pressure drop provided by the combustor for mixing fuel and air.

With reference now to FIG. 2, the remaining portion of air not passed through interior flow passage 103 (e.g., the remaining air, which comprises 40-70% of the total air) is passed unswirled through outer air circuit 120. Low momentum fuel, represented by black arrows 131, is introduced between outer air circuit 120 and air flow 105 in interior flow passage 104. Air flow 105 forms a swirling core which would otherwise expand radially as it flows longitudinally along axis 124 while swirling, but is restrained by the non swirling outer air circuit 120, which forms an outer sheath around swirling core 111 outside of injector 100. Restraining swirling core 111 in this manner maintains the swirl of core 111 for a greater distance into the flow field (e.g., for a longer longitudinal distance in the direction of axis 124). By issuing outer air circuit 120 with no or substantially no swirl, outer air circuit 120 actually promotes swirl and mixing in the air core more than it would if outer air circuit 120 itself had counter-rotation swirl.

It will be appreciated that outer air circuit 120 does generate a high degree of local shearing, both in the circumferential direction and in the axial direction, since swirling core 111 has a lower axial velocity than the external flow of outer air circuit 120. Outer air circuit 120 can be made to converge into core 111 to intensify mixing forces unlike a conventional swirling flow which diverges away from the core and fuel.

Continuing with FIG. 2, inlet air 103 is injected through swirler inlet ports 106, which are formed radially offset relative to axis 124. It will be appreciated by those skilled in the art that this arrangement generates swirl in interior flow passage 104 and creates shearing stresses between outer air circuit 120 and inner core 111 as described above, which intensifies local mixing. It will also be appreciated that even if fuel 131 evaporates and begins to react, there is sufficient air on both sides of fuel 131 to function as an oxidizer on both sides of the reaction zone to promote rapid reactions and more efficiently process the fuel than when pressure atomizing tips are utilized, and that such a rapidly mixed reaction provides less time for NOx pollutants to form. It will also be appreciated that eventually outer air circuit 120 will begin to swirl itself on account of the shear forces imposed by inner core 111.

Figure 3:
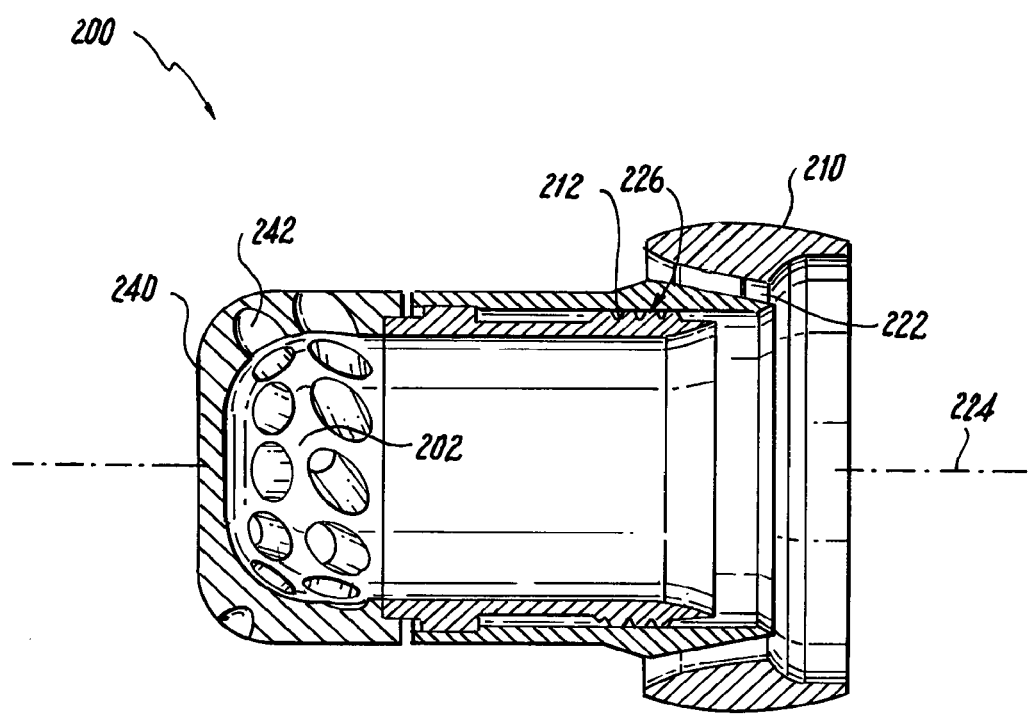
FIG. 3 is a cross-sectional side elevation view of another exemplary embodiment of an airblast injector constructed in accordance with the present invention, showing a slotted outer air circuit.

Referring now to FIG. 3, another exemplary fuel injector 200 is shown. The fuel injector 200 is constructed similarly to fuel injector 100, but has an outer air cap 210 which includes at least one slotted outer air flow channel 222 radially outboard of the fuel passage 212. The flow channel 222 defines the outer air circuit, which appears much like that described above with respect to FIG. 1. Flow channel 222 can converge downstream towards longitudinal axis 224 of nozzle 200 at an angle of about thirty-five degrees or less, preferably between 15-20 degrees, and preferably closer to 15 degrees. Flow channel 222 can alternatively be oriented parallel with the longitudinal axis 224.

Inner air swirler 202 includes an upstream dome 240 with a plurality of cylindrical swirl bores 242 defined therethrough for passage of compressor discharge air into inner air swirler 202. Cylindrical bores 242 of dome 240 are radially offset and converge downstream relative to longitudinal axis 224. Fuel passage 212 includes a multi-start threaded passage 226 defined between inner air swirler 202 and outer air cap 210 for swirling the fuel and providing even fuel distribution at low pressures. Inner air swirler 202 and the outer air circuit can be configured and adapted to pass about 30-60% of the total airflow of injector 200 through inner air swirler 202, with a preferred range of 40-45%, preferably closer to 40% while still utilizing the same overall diameter as nozzle 100. It will be appreciated by those skilled in the art that by directing outer air through slots instead of holes, the amount of space taken up by the outer air passage is reduced (e.g., respective vanes between slots take up less area than area between holes). Thus, the same amount of air may be passed through the outer air circuit using less area. This configuration allows the fuel passage to be provided further radially outward relative to longitudinal axis 224, leaving a larger internal flow passage for inner air. Thus, for a particular diameter of nozzle 200, more air can be passed at the same swirl angle or the same amount of air may be passed with a greater swirl angle relative to nozzle 100.

By way of example, the actual flow area for a given air swirler is affected by the degree of swirl it generates. A straight radial slot has an effective flow area equal to approximately the mean diameter of the slot times the slot height times pi (3.14159). This area minus blockage area caused by any struts in the slot represents the flow area available to air passing through the slot. If the air is swirled, then the slot's area must be increased inversely proportional to the cosine of the swirl angle to pass the same quantity of flow for the same pressure drop across the element (e.g., a swirling flow of 60 deg. will have a cosine of 0.5, and thus require twice the slot height of that of a non-swirling flow). Struts placed between bores 122 passing the outer air in nozzle 100 act as obstructions, and thus do not allow as much air to pass as the nearly continuous slot 222 of nozzle 200.

It will be appreciated that both nozzles 100, 200 will pass more air than conventional nozzles utilizing a swirling flow of air. Obtaining a large proportion of airflow through a highly swirling core of a nozzle requires a relatively large inner passage because of the high degree of swirl and its radially inner location in the nozzle. Therefore, the core passages utilized by nozzles 100, 200 are large relative to the overall diameters thereof. While both nozzles 100, 200 will pass more flow than conventional swirled nozzles of similar diameter, nozzle 200 will pass more air than nozzle 100.

The design of nozzle 200 also eliminates any gaps in the external air flow which may otherwise allow some fuel to prematurely escape the injector flow field. Nozzle 200 produces a higher quantity of swirling air through the core, and promotes a higher level of mixing between the inner and outer air layers compared to conventional configurations.

While conventional nozzles of similar diameter meter air fuel ratios in a range between 2-5 to 1, nozzles 100, 200 may be utilized for very lean combustion (e.g., combustion with a ratio of mass flow of air to fuel greater than 15 to 1, and even greater than 30 to 1 at full power conditions (e.g., full engine power with pressure ratios greater than 55 to 1). The outer diameter of nozzles 100, 200 can vary between one to two inches, with a preferred size of approximately 1.1 inches to 1.4 inches. This size is large enough to keep the total number of nozzles required to a minimum, but not so large that it unduly affects the size of the combustor. Thus, it will be appreciated that while nozzles 100, 200 may be used with conventional air to fuel ratios, they may also be utilized to maximize an air flow having some degree of swirl for enhanced mixing capability through the smallest diameter possible as described above.

The methods and systems of the present invention, as described above and shown in the drawings, provide air blast injectors tailored for multipoint injection and combustion with superior properties including reduced $NO_x$ emissions and very lean combustion with high air to fuel ratios at both low and high power operation. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. An airblast injector for a multipoint combustor system comprising:
   an inner air swirler defining an interior flow passage and a plurality of swirler inlet ports in an upstream portion thereof configured and adapted for fluid communication of compressor discharge air through the swirler inlet ports into the interior flow passage such that swirl is imparted on flow in the interior flow passage; and
   an outer air cap mounted radially outboard of the inner swirler relative to a longitudinal axis defined by the inner air swirler and the outer air cap, with a fuel passage defined between the inner air swirler and the outer air cap, the fuel passage including a discharge outlet between downstream portions of the inner air swirler and the outer air cap for issuing fuel for combustion, and wherein the outer air cap defines an outer air circuit configured for substantially swirl-free injection of compressor discharge air outboard of the interior flow passage.

2. An airblast injector as recited in claim 1, wherein the outer air cap includes a plurality of cylindrical bores therethrough radially outboard of the fuel, wherein the cylindrical bores define the outer air circuit.

3. An airblast injector as recited in claim 2, wherein the cylindrical bores are oriented to converge toward the longitudinal axis defined by the inner air swirler and outer air cap.

4. An airblast injector as recited in claim 1, wherein the inner air swirler and outer air circuit are configured and adapted to pass about 30-60% of the total airflow of the injector through the inner air swirler.

5. An airblast injector as recited in claim 1, wherein the outer air cap includes a plurality of slotted outer air flow channels radially outboard of the fuel passage, wherein the slotted outer air flow channels define the outer air circuit.

6. An airblast injector as recited in claim 5, wherein the slotted airflow channels converge downstream towards the longitudinal axis defined by the inner air swirler and outer air cap.

7. An airblast injector as recited in claim 5, wherein the inner air swirler and outer air circuit are configured and adapted to pass about 30-60% of the total airflow of the injector through the inner air swirler.

8. An airblast injector as recited in claim 1, wherein the fuel passage includes a multi-start threaded passage defined between the inner air swirler and the outer air cap for even fuel distribution at low pressures.

9. An airblast injector as recited in claim 1, wherein the inner air swirler includes an upstream dome with a plurality of cylindrical swirl bores defined therethrough for passage of compressor discharge air into the inner air swirler.

10. An airblast injector as recited in claim 9, wherein the cylindrical bores of the inner air swirler are radially offset and converge downstream relative to the longitudinal axis defined by the inner air swirler and outer air cap.

\* \* \* \* \*